April 29, 1969
J. B. MOTLEY ET AL
3,440,858
FORMING APPARATUS
Filed Sept. 28, 1964
Sheet 1 of 5
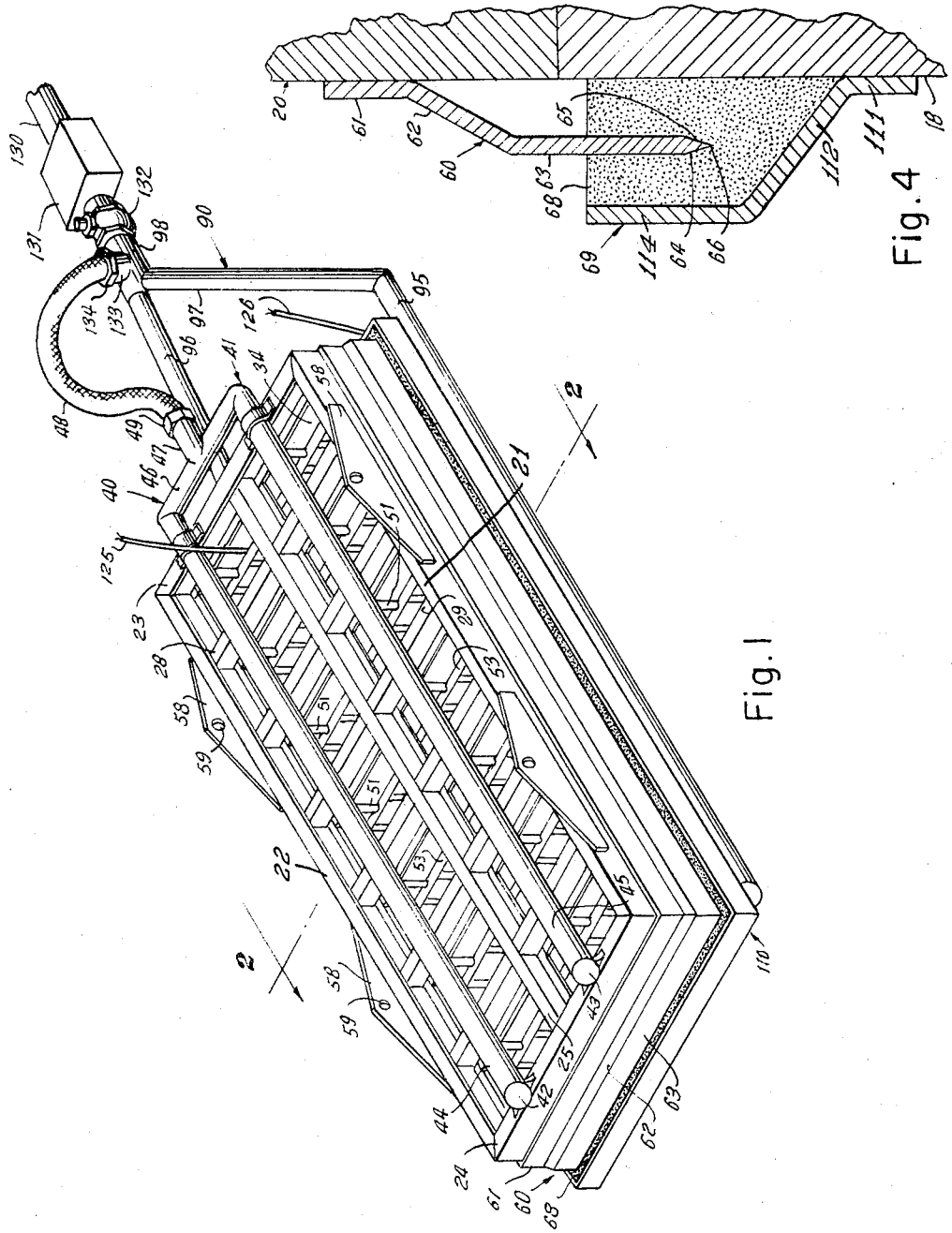
INVENTORS
Joe Bailey Motley
Raymond H. Shape
BY
ATTORNEYS INVENTORS
Joe Bailey Motley
Raymond H. Shape
ATTORNEYS

United States Patent Office 3,440,858
Patented Apr. 29, 1969

3,440,858
FORMING APPARATUS
Joe Bailey Motley and Raymond H. Shape, Garland, Tex., assignors to Intercontinental Manufacturing Company, Inc., Garland, Tex., a corporation of Texas
Filed Sept. 28, 1964, Ser. No. 399,812
Int. Cl. B21d 37/16
U.S. Cl. 72—342   8 Claims

ABSTRACT OF THE DISCLOSURE

A forming apparatus which has a pair of forming members between which work pieces are positionable, the forming members having means for forming a closed chamber about the work piece and the forming members. The apparatus also has means for replacing the air in the chamber with an inert gas and for raising the temperature of the work piece and of the forming members.

---

This invention relates to forming apparatus and methods and more particularly to an apparatus and method for working or treating work pieces in controlled environments.

An object of this invention is to provide a new and improved apparatus and method for working or forming work pieces made of substances whose characteristics are such that the working thereof must be in environments whose temperature, atmosphere, pressure and the like must be controlled.

Another object of this invention is to provide a new and improved apparatus and method for forming work pieces at temperatures above a critical temperature which requires that the work piece be in a selected atmosphere, to prevent its oxidization corrosion or other change in its structure or characteristics.

Another object is to provide an apparatus and method for forming work pieces at temperatures above critical temperatures at which the characteristics of the substance of which the work piece is made change in an undesired manner.

Still another object is to provide a new and improved apparatus and method for raising the temperature of a work piece to a desired forming temperature above a critical oxidation temperature and then forming of the work piece while maintaining the work piece isolated from oxygen.

A further object is to provide an apparatus for forming a metal work piece between two forming surfaces wherein the apparatus has means providing a substantially closed chamber about the forming surfaces and the work piece and means for delivering a desired gas into the chamber to displace the air therein prior to the raising of the temperature of the work piece above its critical temperature.

A still further object is to provide a forming apparatus having a pair of die assemblies and having means providing a gas permeable continuous barrier about their peripheries which inhibits flow of gas between the atmosphere and the chamber formed by the die assemblies.

Another object is to provide an apparatus having means for raising the temperature of the forming surfaces between which the work piece is positionable and by which it is engageable and of the work piece while maintaining the forming surfaces and the work piece in a desired atmosphere.

Still another object is to provide an apparatus wherein at least one of the die assemblies is provided with means for accelerating the cooling of the work piece after its forming.

Still another object is to provide an apparatus for forming work pieces in an inert gas at a high temperature which is above the critical oxidizing temperature of the substance of which the work piece is formed.

Additional objects and advantages of the invention will be readily apparent from the reading of the following description of a device constructed in accordance with the invention, and reference to the accompanying drawings thereof, wherein:

FIGURE 1 is a perspective view of a forming apparatus embodying the invention;

FIGURE 4 is a fragmentary sectional view showing the gas permeable seal means of the apparatus;

Figure 3:
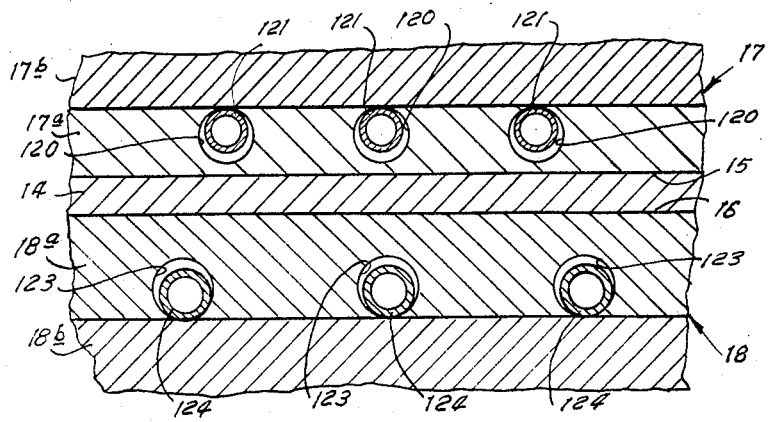
FIGURE 3 is a fragmentary enlarged sectional view of the die plates of the forming apparatus showing the means for heating the die plates.
Figure 2:
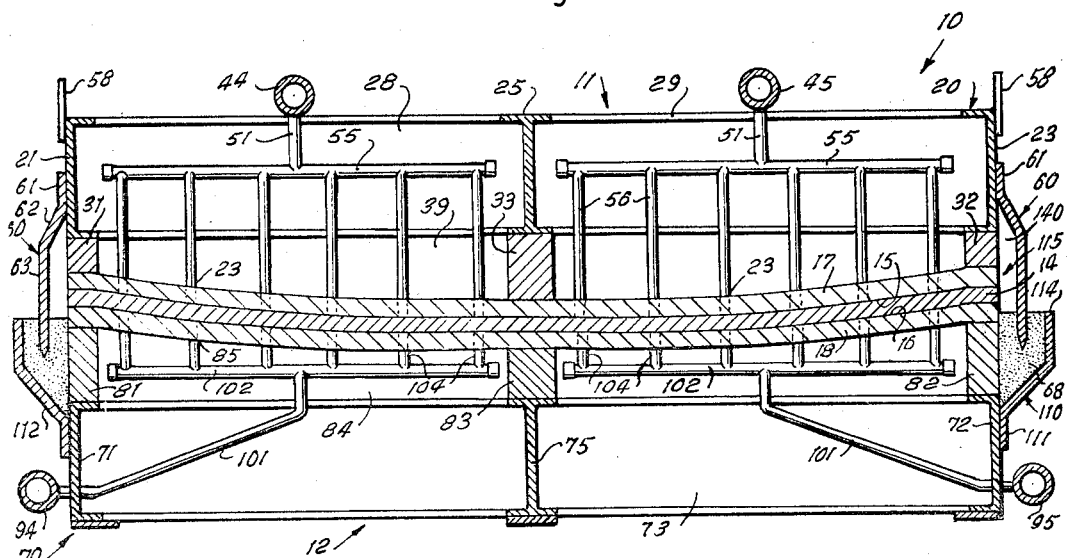
FIGURE 2 is a sectional view taken on line 2—2 of FIGURE 1.

Referring now particularly to FIGURES 1 through 4 of the drawings, the forming apparatus 10 includes a top die assembly 11 and a bottom die assembly 12 between which a metal work piece 14 may be placed whereby when the top die assembly is moved downwardly toward the bottom die assembly, the work piece is formed to the configuration of the die surfaces 15 and 16 of the upper and lower die plates 17 and 18, respectively.

The top die assembly 11 includes a horizontal frame 20 having longitudinal channel shaped side members 21 and 22 connected at their opposite ends by the end channel members 23 and 24. The side and end frame members may be rigidly secured to one another in any suitable manner as by welding. The longitudinal central I-beam or brace member 25 of the frame extends parallel to and between the side frame members with its opposite ends abutting and rigidly secured, as by welding, to the end frame members 23 and 24. A plurality of longitudinally spaced transverse brace members 28 and 29, which also may be I-beam in shape, extend between the central brace member and the side frame members 21 and 22, respectively, and are rigidly secured thereto, as by welding.

The top die assembly includes longitudinal side spacer bars 31 and 32 whose top surfaces abut the bottom surfaces of the side frame members and which are rigidly secured in any suitable manner, as by welding or bolts, to the side frame members 21 and 22, respectively. A longitudinal central spacer bar 33, disposed below the central brace member is connected thereto in any suitable manner, as by bolts or welding.

The central spacer bar 33 is of greater height than the side spacer bars since the die plate 17 is of substantially arcuate shape. Transverse end spacer bars 34, one of which can be seen in FIGURE 2, extend between the end frame members 23 and 24 on the top surface of the die plate with their lower bottom surfaces having the same configuration as the top surface of the die plate. The transverse end spacer bars 34 are rigidly secured to the end frame members 23 and 24 in any suitable manner, as by welding. The bottom surfaces of the spacer bars abut the top surface of the die plate and the die plate is rigidly secured to the spacer bars by bolts, welding or the like.

The die plate has a plurality of spaced passages 35 through which an inert gas such as argon, helium and the like, may flow to the bottom of the die plate. The inert gas is supplied to the passages through a manifold 40 which includes a substantially U-shaped tubular conduit or pipe 41, the ends 42 and 43 of whose longitudinal legs 44 and 45 are closed and whose intermediate connecting portion 46 is provided with an inlet 47 to which one end of a flexible conduit 48 is connected by a suitable fitting 49. The manifold is secured to the frame in any suitable manner, as by straps 50 which extend about the legs 44 and 45 and are secured to the end frame members by screws or bolts.

A plurality of outlet ducts 51 extend downwardly at longitudinally spaced locations from each of the manifold legs 44 and 45, respectively, toward the die plate. The outlet ducts 51 are connected to horizontal ducts 55 disposed between the central brace member and the side frame members and which have dependent branch ducts 56 whose lower ends, secured to the upper die plate in any suitable manner, as by welding or the like, open to the upper ends of the passages 35 of the die plate. It will thus be apparent that when inert gas under pressure is transmitted to the manifold through the flexible conduit 48, it will flow through the manifold and the ducts 51, 55 and 56 to the passages 35 of the die plate and thence to below the die plate at a plurality of spaced locations along its bottom forming surface 15.

A plurality of support or hanger plates 58 are rigidly secured to the side frame members 21 and 22, as by welding. The hanger plates have apertures 59 by means of which the upper die assembly may be moved by any suitable hoist means whose fastening means, such as hooks, are receivable in the apertures of the hanger plates.

A rectangular skirt or seal member 60 extends about the rectangular frame and has a top vertical portion 61 which abuts the outside surfaces of the side and end frame members and is rigidly secured thereto as by bolts, screws or the like. An intermediate portion 62 of the seal member extends downwardly and outwardly in order that the bottom vertical section 63 thereof be spaced outwardly of the outer surfaces of the die plate 17. Any suitable sealing means, such as cement, a gasket or the like may be interposed between the top section 61 and the side surfaces of the frame members to provide an air tight seal therebetween. Similarly, a sealing cement, gasket or the like may be interposed between the top surface of the die plate and the spacer bars 30, 31, 32 and 34 which extend between the frame members to prevent leakage of gas therebetween. The lower end portion of the bottom section has downwardly convergent surfaces 64 and 65 which converge to the narrow bottom edge 66 thereof in order to define a wedge which facilitates entry thereof into the sand 68 which is held in the upwardly opening rectangular trough 69 of the bottom die assembly.

The bottom die assembly 12 includes a rectangular bottom frame 70, substantially similar to the frame 11 of the top assembly having longitudinal channel shaped side members 71 and 72 connected at their opposite ends by the end channel members 73. The side and end frame members are rigidly secured to one another in any suitable manner, as by welding. The longitudinal central I-beam or brace member 75 of the bottom frame extends parallel to and between the side frame members with its opposite ends abutting and rigidly secured as by welding to the end frame members 73. A plurality of longitudinally spaced frame members which may also be I-beam in shape, may extend between the central brace member 75 and the side frame members 71 and 72, respectively, and may be rigidly secured thereto as by welding. Such transverse brace members of the frame of the bottom die assembly would be arranged in the same manner as the transverse brace members 28 and 29 of the frame of the top die assembly.

The bottom die assembly includes longitudinal side spacer bars 81 and 82 whose bottom surfaces rest on the top surfaces of the side frame members 71 and 72, respectively, and are rigidly secured thereto in any suitable manner, as by welding or bolts. A longitudinal central spacer bar 83, disposed above the central brace member 75 with its bottom surface resting on the top surface of the central brace member, is secured to the central brace member in any suitable manner, as by bolts or welding. The central spacer bar is of lesser height than the side spacer bars 81 and 82 since the die plate is of arcuate shape, curving downwardly from its opposite side edges. Transverse end spacer bars 84, one of which can be seen in FIGURE 2, extend between the end frame members 73 and the bottom surface of the die plate with their top surfaces having the same configuration as the bottom surface of the bottom die plate 18. The transverse end spacer bars 84 are rigidly secured to the end frame members 73 in any suitable manner, as by welding. The bottom surface of the die bottom plate 18 rests on the top surfaces of the spacer bars and is rigidly secured to the spacer bars as by bolts, welding, or the like.

The bottom die plate has a plurality of spaced passages 85 through which an inert gas, such as argon, helium and the like may flow to the top of the die plate. The inert gas is supplied to the passages 85 through a manifold 90 which includes longitudinal legs 94 and 95 which extend outwardly of the sides of the frame 71 and whose end portions 96 and 97 converge toward, and are connected to, a supply duct 98.

The longitudinal legs 94 and 95 of the manifold 90 are provided with a plurality of longitudinally spaced outlet ducts 101 which extend inwardly through suitable apertures in the side frame members 71 and 72. The upper ends of the outlet ducts are connected to horizontal ducts 102 spaced longitudinally along the frame and on opposite sides of the central spacer bar 83. The horizontal ducts are provided with a plurality of transversely spaced upwardly extending branch ducts 104 whose upper ends are rigidly connected in any suitable manner, as by welding, to the die plate and which open to the passages 85 of the bottom die plate. It will thus be apparent that when the inert gas under pressure is transmitted to the manifold from the supply duct 98 it will flow through the manifold and the ducts 101, 102 and 104 to the passages 85 of the duct and thence upwardly at a plurality of spaced locations along the top forming surface 16 of the bottom die plate. A suitable seal means, such as cement, gasket or the like, is interposed between the adjoining adjacent surfaces of the spacer bars and the bottom die plate and the frame members to seal therebetween.

The upwardly opening rectangular trough 69 is provided by a rectangular seal member 110 whose vertical bottom portion 111 abuts the outer surfaces of the side and end members of the frame 70 and is rigidly secured thereto in any suitable manner, as by bolts and the like. A suitable sealing means is interposed between the outer surfaces of the frame members of the frame 70 and the bottom portion 111 to seal therebetween. The bottom seal member also has an intermediate upwardly and outwardly extending intermediate section 112 which connects the bottom portion to the vertical top portion 114 of the seal means which is spaced outwardly of the bottom portion 111 and also spaced outwardly of the bottom section 63 of the top seal member. The trough 69 is filled with a suitable temperature heat resistance granular substance, such as silica sand or the like, which is free flowing to permit its displacement as the bottom section of the seal member telescopes downwardly into the trough and which provides resistance to the flow of gas from the chamber 115 formed by the top and bottom die assemblies when the top die assembly is lowered to such position that the seal member 60 extends downwardly into the trough 69.

Referring now to FIGURE 3, the top and bottom die plates may be formed of a suitable heat resistance material, such as the ceramic substance commercially available under the trademark "Glasrock." The forming surfaces 15 and 16 of the die plates are provided by solid layers 17a and 18a of the ceramic substance secured to the bottom and top surfaces of the body portions 17b and 18b, respectively, formed of foamed ceramic substance. The layer 17a is provided with a plurality of transverse longitudinally spaced passages 120 therethrough in which are inserted any suitable electric heater elements 121, such as "Calrods." The layer 18a of the die of the bottom plate is similarly provided with transverse longitudinally spaced passages or bores 123 in which are disposed similar electric heater elements 124. The heater elements 121 and 124 are energized with electric current supplied thereto by means of the cables 125 and 126, respectively, which extend to the heating elements through suitable apertures in the die plates.

When the apparatus is employed to practice the method of the invention to form a work piece 14 formed of a substance, such as titanium for example, which must be formed at a high temperature, for example 1250 to 1500 degrees Fahrenheit, which is above the temperature at which it oxidizes readily, for example 800 degrees Fahrenheit, the work piece and the die plates are heated to a temperature slightly below such critical oxidizing temperature, for example 775 degrees Fahrenheit, and the work piece is inserted between the die plates after the top die assembly has been raised to permit such insertion. If the work piece 14 is flat, it is positioned on the bottom die plate and, since the top forming surface 16 of the bottom die plate is concave, the flat work piece is supported only at its outer side edges by the bottom die plate. The top die assembly is then slowly lowered until the bottom edge of the top seal member 60 moves into the sand 68 in the trough and the forming surface 15 of the top die plate is spaced slightly above the top flat surface of the work piece.

An inert gas is then introduced under pressure into the manifolds 40 and 90 from a suitable source through the duct 130, a preheater 131, the supply duct 98 and valve 132 which is connected in the supply duct 98. The flexible conduit 48 is connected to a branch duct 133 of the supply duct by means of a suitable fitting 134. The inert gas which is also at a temperature below the critical oxidizing temperature now flows through the apertures 35 of the upper plate into the space between the forming surface 15 and the top surface of the work piece and simultaneously flows through the passages 85 of the bottom die plates into the space between its forming surface 16 and the bottom surface of the work piece. The inert gas flowing into the chamber formed by the two die assemblies flows first through the spaces between the work piece and the forming surfaces into the rectangular space or passage 140 above the sand within the top seal member 60 and then downwardly through the sand about the bottom edge of the top seal member and then upwardly through the sand and between the bottom portion 63 of the top seal member and the top vertical portion of the bottom seal member to the atmosphere thus replacing any oxygen containing air ahead thereof. Such flow of inert gas is continued for a period of time sufficiently long to displace all or substantially all of oxygen from this chamber. Once all the air has been replaced by the inert gas, the valve 132, which may be a pressure regulator valve, may be adjusted to maintain a slightly higher than atmospheric pressure within the forming apparatus so that outside air will not tend to flow downwardly through the sand and then upwardly into the die apparatus. The silica sand which is of course a good heat insulator will also tend to prevent dissipation of heat and also the flow of gas therethrough thus economizing on the expenditure or consumption of the inert gas.

The top die assembly is then lowered until at least the central portion of its die forming surface 15 comes into contact with the top surface of the work piece and the temperature of the two die plates is now raised by increasing the flow of current through their heater elements to the forming temperature which may be 1400 degrees Fahrenheit. Such contact of the top die plate with the work piece facilitates or increases the heat transfer between the die plate and the work piece and, when the temperature of the work piece is raised to the temperature at which it is to be formed, the top die assembly is lowered until the work piece is brought throughout its full length and width into forming contact with the forming surfaces 15 and 16.

As the top die assembly is lowered to its lowermost position relative to the bottom die assembly, the depth of insertion of the top seal member in the sand is increased substantially so the pressure within the die apparatus and the passage 140 may be maintained above the atmospheric pressure without requiring a relatively great rate of flow of the inert gas through the apparatus since the resistance offered by the sand to flow of gas therethrough increases with the length of the path of flow of the gas through the sand.

When the work piece has been formed to the form predetermined by the contours of the forming surfaces 15 and 16, the heater elements 121 and 124 are disconnected from the source of current and the work piece and die plate are allowed to cool below the critical oxidizing temperature, in this case 800 degrees Fahrenheit, while the work piece is still maintained out of contact with oxygen by means of the regulator valve 132 which maintains the pressure of the inert gas within the die apparatus above the ambient atmospheric pressure.

It will now be seen that the method of forming the work piece while it is at a temperature above a critical oxidizing temperature of the substance of which it is formed includes the steps of placing the work piece between a pair of forming members such as the die plates 17 and 18, forming a substantially closed chamber about the work piece and forming members, displacing the air in the chamber with an inert gas while the work piece is held at a temperature below the critical temperature, raising the temperature of the forming members and of the work piece to a forming temperature above the critical oxidizing temperature, forming the work piece to the desired form, and maintaining the formed work piece in an atmosphere substantially free from oxygen while cooling it to a temperature below the critical oxidizing temperature.

It will further be seen that the method of the invention may include moving at least one of the forming members into contact with the work piece after the oxygen containing air in such chamber has been displaced by the inert gas to facilitate transfer of heat to the work piece from the heated forming member.

It will also now be seen that a new and improved forming apparatus has been illustrated and described which includes top and bottom die assemblies which are movable toward one another and having a gas permeable seal means about their peripheries providing a substantially closed chamber or space therebetween and about a work piece which is positionable between the assemblies to be formed thereby into a predetermined shape or configuration.

It will further be seen that the apparatus includes means for raising the temperature of the dies and of the work piece and with means for introducing an inert gas into the chamber to displace the oxygen containing air prior to the raising of the temperature of the work piece above a critical oxidizing temperature.

It will further be seen that the seal means includes a trough extending about the bottom die assembly filled with a granular free flowing substance, such as silica sand and a seal member extending downwardly from the top seal assembly and telescopable into the trough as the top die assembly is lowered relative to the top and bottom die assembly.

Figure 6:
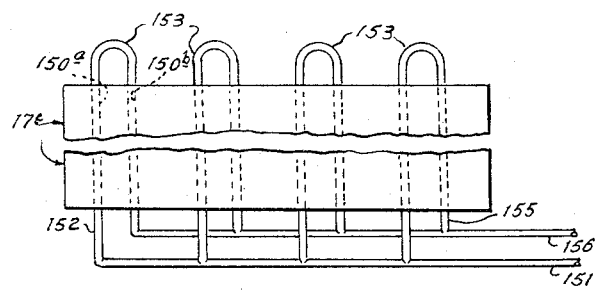
FIGURE 6 is a top view of the die plate illustrated in FIGURE 5.
Figure 5:
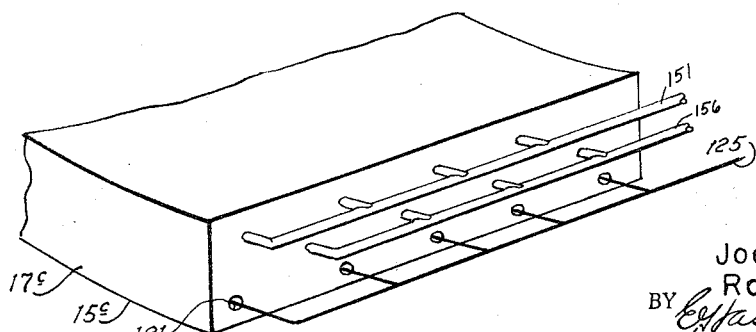
FIGURE 5 is a fragmentary perspective view of a modified form of a die plate usable in the apparatus illustrated in FIGURES 1 through 4.

Referring now to FIGURES 5 and 6 of the drawing, either or both of the die plates, such as the die plate 17c may be provided with means for accelerating the rate of cooling thereof. The die plate 17c is substantially similar to the die plate 17 differing therefrom only in having a plurality of pairs of adjacent transverse flow passages 150a and 150b extending therethrough. A cooling fluid, such as air or a refrigerant gas, is circulated through each pair of passages by means of an inlet manifold 151 whose branch ducts 152 are secured to one side of the die plate and communicate with the passages 150a. Each pair of passages 150a and 150b are connected at the opposite side of a die plate by the connector ducts or pipes 153 secured in any suitable manner to the other side of the die plate. The other ends of the passages 150b are in communication with the branch ducts 155 of an outlet manifold 156, the branch ducts 155 being connected in any suitable manner to the die plate.

It will therefore be apparent that when a cooling fluid, such as air, compressed refrigerant gas and the like, is circulated through the transverse passages 150, the temperature of the die plate is quickly lowered. The provision of such cooling means for one or both of the die plates of the apparatus will of course reduce the time necessary needed to cool the die plates and the work piece below the critical oxidizing temperature.

It will be apparent that the cooling of the die plates will be substantially uniform across the full length of the die plate since each adjacent pair of passages 150a and 150b is connected across the inlet and outlet manifolds 150 and 156 of such die plate.

It will further be seen that the practice of the method of the invention by an apparatus wherein one or both of the die plates is provided with such cooling means may include the additional step of cooling at least one of the die plates to accelerate the rate of cooling of the work piece after it has been formed to a temperature below the critical oxidizing temperature.

It will further be seen that the apertures 35 and 85 of the die plates are relative small in cross-sectional diameter and will not cause undesired distortion of a work piece.

Figure 8:
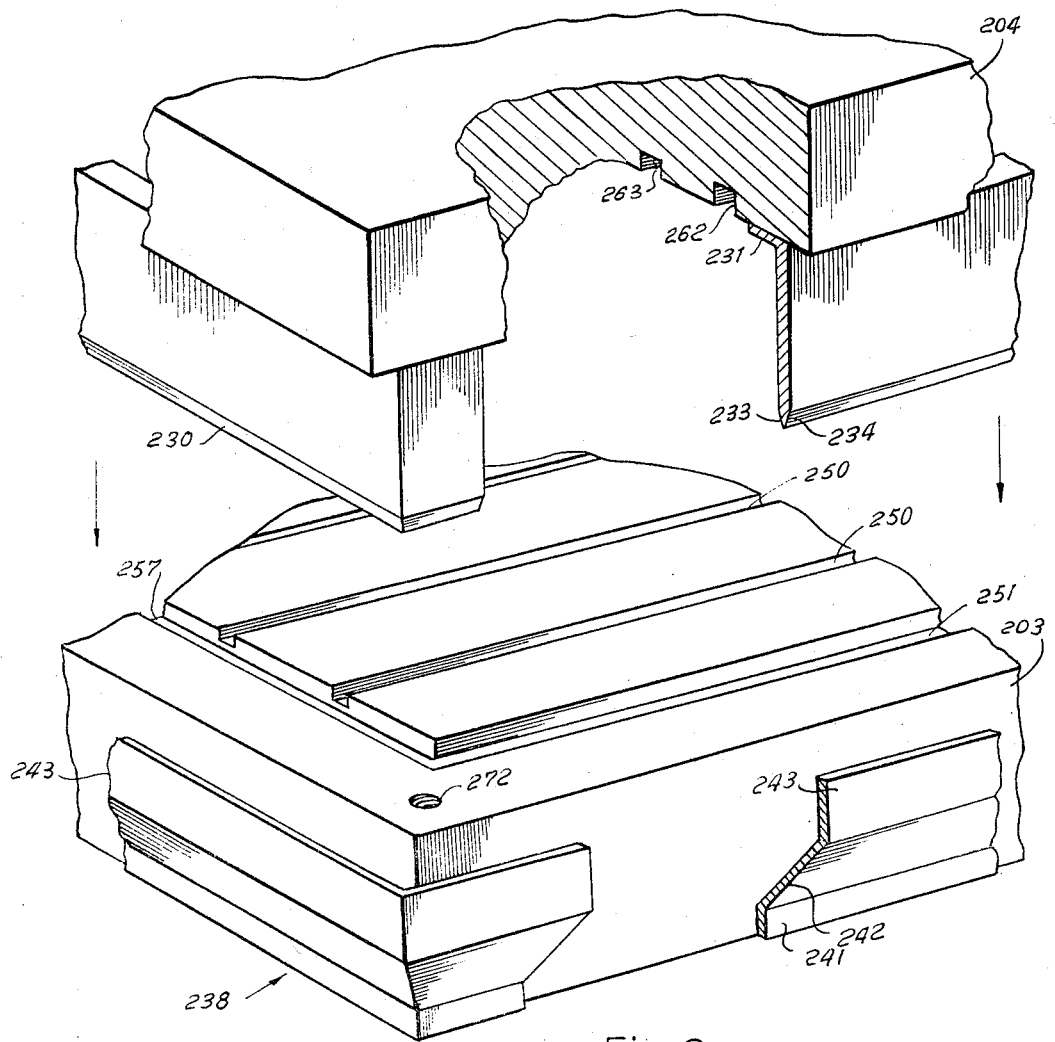
FIGURE 8 is a fragmentary perspective view, with some parts broken away of the press bed and ram plate of the press apparatus of FIGURE 7.
Figure 7:
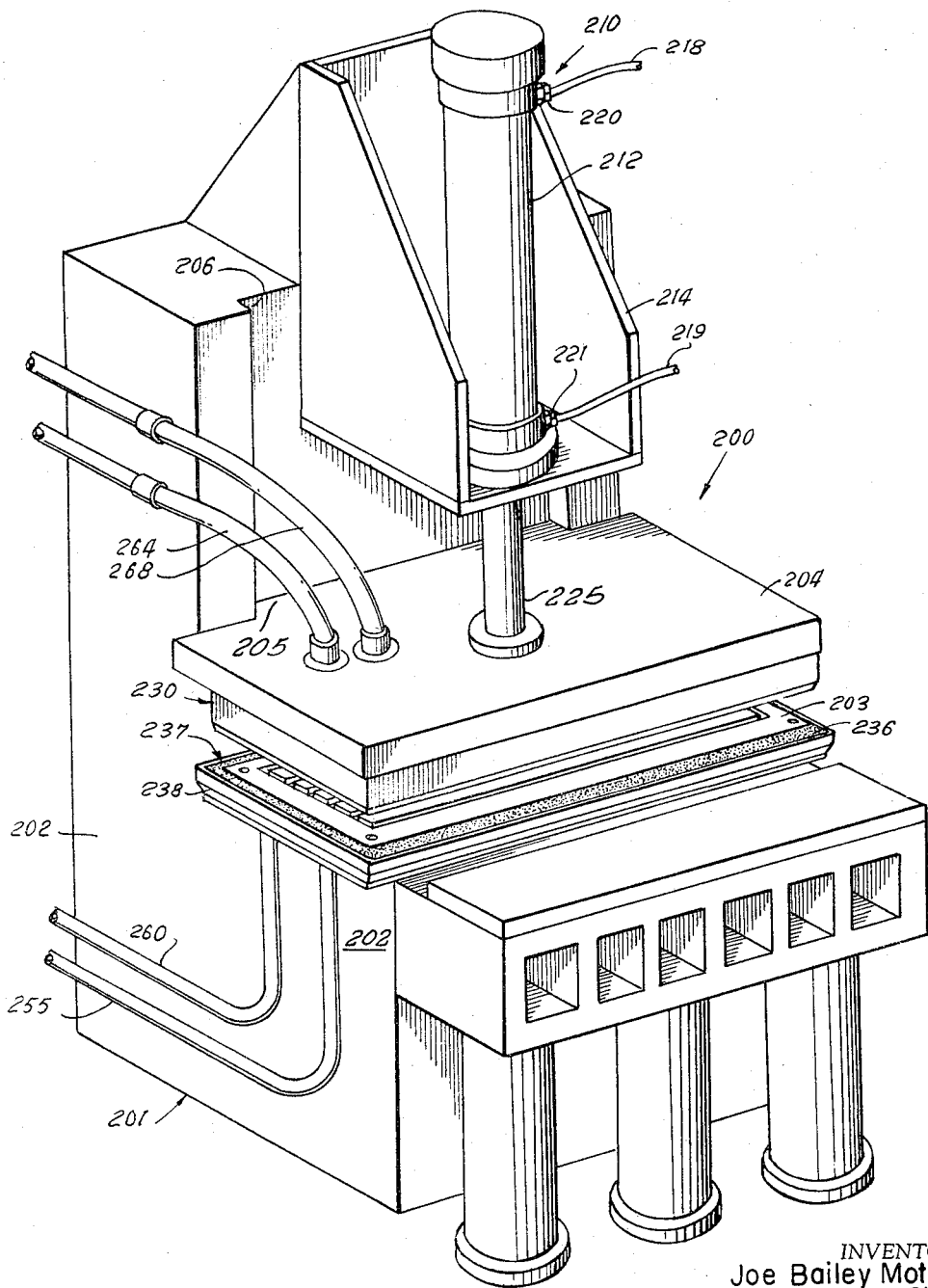
FIGURE 7 is a schematic perspective view of a press apparatus embodying the invention.

Referring now to FIGURES 7 and 8, of the drawings, the press apparatus 200 embodying the invention has a base structure 201 which is mounted on a suitable support or floor and which has a forwardly extending bed poriton 202 on which the press bed 203 of the press is rigidly mounted. The ram plate 204 of the apparatus has the usual tongue portion 205 which is slidable in the vertical groove 206 of the base structure to guide its vertical movement and which is movable between its uppermost and lowermost position by a hydraulic ram 210. The cylinder 212 of the hydraulic ram is rigidly mounted on a bracket 214 which in turn is rigidly secured as by bolts, welding or the like to the base structure 201. Hydraulic fluid under pressure may be introduced into or exhausted from the interior of the cylinder on opposite sides of the piston of the ram by means of suitable conduits 218 and 219 connected to the cylinder by suitable fittings 220 and 221. The piston rod 225, to whose upper end the ram piston is rigidly secured, is secured at its lower end to the ram plate 204 whereby the ram plate is movable upwardly and downwardly with the piston rod 225.

The ram plate has a top seal member 230 rigidly secured to its bottom surface. The continuous rectangular seal member extends downwardly from the ram plate and has internal horizontal flange 231 which abuts the bottom surface of the ram plate and which is rigidly secured thereto in any suitable manner. The bottom edge portion of the top seal member has downwardly convergent inner and outer surfaces 233 and 234 to facilitate the movement of the top seal member into the sand 236 in the trough 237 provided by the bottom seal member 238.

The bottom seal member is rectangular and extends about the press bed or bolster plate. It has a bottom vertical portion 241 which abuts the vertical side surfaces of the bed or bolster plate 202 and which is rigidly secured thereto in any suitable manner as by welding, bolts or the like. The intermediate portion 242 of the bottom seal member extends upwardly and outwardly from the bottom portion to the vertical top portion 243 whereby the vertical top portion 243 is spaced from the sides of the bolster plate to form the trough 237 in which the silica sand 236 is received.

The bolster plate at its upper surface has a plurality of parallel grooves 250 and a continuous rectangular groove 251 into which opposite ends of the parallel grooves 250 open. An inert gas under pressure is introducible into the continuous peripheral groove 251 through a conduit 255 secured to the bottom side of the bolster plate which opens to the vertical bore or passage 257 which opens upwardly into the continuous peripheral groove 251. The bolster plate may also be provided, like the die plates 17 and 18, with heater elements which extend through suitable apertures in the bolster plate by means of which the temperature of the bolster plate may be raised to any suitable temperature. Such heater elements may be connected to a suiable input source of electric current by a means of a cable 260.

Figure 9:
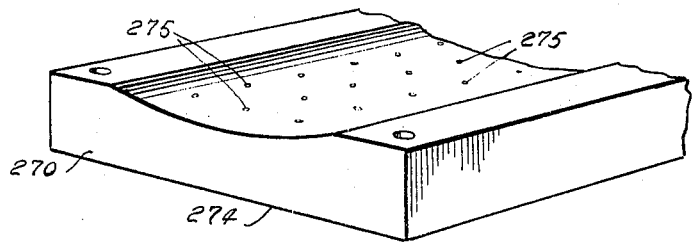
FIGURE 9 is a fragmentary perspective view of a die mountable on either the press bed or ram plate of the apparatus illustrated in FIGURES 7 and 8.

The ram plate 204 at its bottom surface is provided with a continuous peripheral downwardly opening groove 262 and with any number of parallel grooves 263 which open thereinto in the same manner as the top surface of the bolster plate is provided with the continuous groove 250 and the parallel grooves 251. An inert gas in introduceable into the continuous groove 262 through a conduit 264 connected to the ram plate which communicates with a vertical passage of the ram plate which opens downwardly into the continuous rectangular groove 262. The ram plate may also be provided with heater elements which are connectable to an input circuit of electric current by means of a cable 268. Suitable dies such as the die 270, FIGURE 9 are rigidly securable to the top and bottom surfaces of the bolster and ram plates by bolts which are receivable in suitable threaded bores 272 of the two plates. Such die plates have planar surfaces 274 which are engageable with the flat top and bottom surfaces of the bolster and ram plates, respectively. The threaded bores 272 of the bolster and ram plates and of such dies are located outwardly of the peripheral grooves 260 and 262 thereof. Each such die is provided with a plurality of spaced vertical passages 275 whose ends open to the peripheral groove or to the parallel grooves of the ram or bolster plate on which such die is mounted.

It will thus be apparent that work piece may be placed on such die mounted on the bolster plate and the ram plate lowered until the bottom edge portion of its top seal member 230 telescopes into the sand in the trough 237. Inert gas is then introduced into the chamber between the top and bottom plates closed by the top and bottom seal members and will flow upwardly through passages in the die secured to the bolster plate and downwardly through passages in the die secured to the ram plate to drive all oxygen containing air out of the chamber formed by the seal members and the bolster and ram plates. The temperature of the work piece is then raised to its forming temperature, the ram plate is moved downwardly until the work piece is formed between the forming surfaces of the two dies while the such chamber is still filled with an inert gas. The work piece is then kept in the insert gas and between the die plates until its temperature is cooled below its critical oxidizing temperature whereupon the ram plate is raised to permit removal of the now formed work piece.

If desired, either or both of the ram and bottom plates may be provided with cooling passages through which a cooling fluid may be circulated to accelerate the rate of cooling of the work piece after its forming.

It will be apparent that when the apparatus is provided with the seal and the heating elements the dies which have the forming surfaces need not be provided with such means whereby the cost of the individual die plates is greatly reduced.

It will now be apparent that the press apparatus 200 may also be employed to practice the method of the invention.

Figure 10:
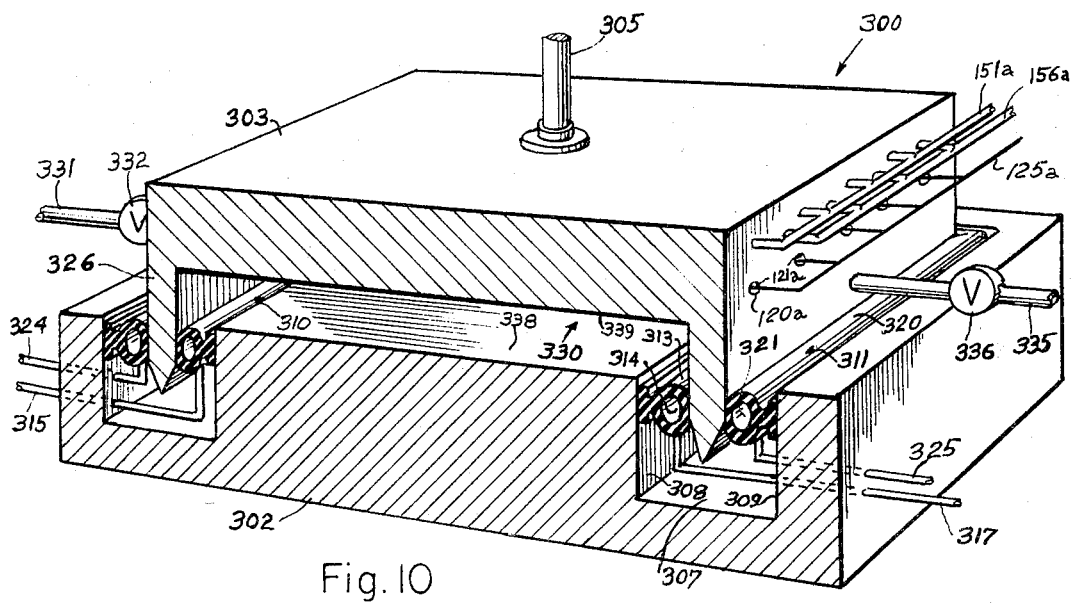
FIGURE 10 is a schematic partly sectional view of a modified form of the apparatus.
Figure 11:
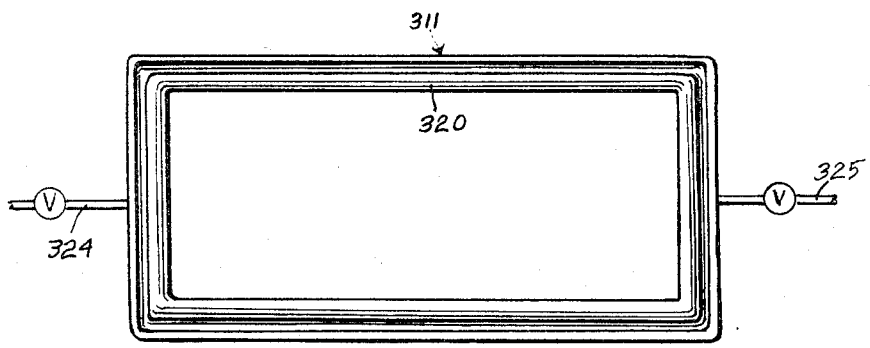
FIGURE 11 is a schematic view of a seal of the apparatus illustrated in FIGURE 10.

Referring now particularly to FIGURES 10 and 11 of the drawing, the forming apparatus 300 includes a bottom press bed or plate 302 which may be mounted on any suitable base structure of a press, such as the base structure 201 of the apparatus 200 illustrated in FIGURE 7, and a ram plate 303 which is movable vertically relative to the bed plate by any suitable means such as a piston rod 305 of a hydraulic ram which may be similar to the hydraulic ram 210 of the apparatus illustrated in FIGURE 7. The bed plate has a continuous upwardly opening rectangular groove 307 whose sides are defined by the inner vertical surface 308 and outer vertical surface 309. Inner and outer seal members 310 and 311 are secured, as by bonding, respectively, to the vertical parallel surfaces 308 and 309. The inner seal 310 has a hollow bead 313 into whose continuous passage 314 a suitable fluid may be introduced or removed through conduits 315 and 317 which extend outwardly of the groove 307 through suitable apertures in the bed plate.

The conduits 315 and 317 open to the pressure 314 at opposite sides or locations so that fluid introduced into the passage through one conduit, for example, the conduit 315, will flow through the passage in the sides 315a and 315b thereof and then to the conduit 317 so that if desired circulation of a pressure or coolant fluid may be achieved throughout all portions of the passage. The outer seal 311 similarly has a hollow bead 320 into whose continuous passage 321 fluid may be introduced or removed through conduits 324 and 325 which also extend through suitable apertures in the bed plate.

The ram plate is provided with a continuous downwardly extending seal member or flange 326 which may be integral with the ram plate and which extends between the two seal members when the ram plate is lowered to operative position relative to the bed plate 302. The ram plate may be provided with heater elements 121a which are received in suitable longitudinally spaced transverse passages of the ram plate and to which electric current may be supplied through a cable 125a with transverse passage through which a cooling fluid may be circulated from an input manifold 151a to an outlet or returned manifold 156a in the same manner as described above in connection with the die plate 17c. If desired, of course, the bed plate 302 also may be provided with heating elements and such cooling means.

Any desired gas or atmosphere may be introduced into the hollow chamber 330 between the ram and bed plates through a suitable conduit 331 which may have a valve 332 connected therein and gas may be exhausted through an outlet conduit 335 which may also have a valve 336 connected therein.

It will be apparent that suitable dies may be mounted in the usual manner on the planar facing surfaces 338 and 339 of the bed and ram plates of the apparatus 300 in any usual suitable manner well known to those skilled in the art.

In use, the work piece which is to be worked or formed between such dies mounted on the bed and ram plates is placed on the die mounted on the bottom or bed plate and the ram is then moved downwardly, its seal flange 326 moving downward into the groove 307 of the bed plate and between the inner and outer seal members 310 and 311. The fluid under pressure is then introduced into the hollow passage of each of the two seal members either through one of the conduits connected thereto while the other conduit of each seal member is closed by a suitable valve to cause the beads to expand and sealingly engage the seal flange of the ram plate thus sealing the chamber 330 against flow of fluids. If it is desired to replace the air in such chamber with a particular atmosphere such as an inert gas, and oxidizing gas, or an atmosphere of a mixture of gases in predetermined proportions, such desired gas or atmosphere is circulated through the chamber 330 through one of the conduits 331 or 335 and then outwardly through the other conduit 331 or 335, respectively, until all of the original atmosphere in the chamber is replaced by the desired atmosphere. If desired, such atmosphere may be preheated and either or both the bed and ram plates, if provided with heating elements, may be heated to the desired temperature. Alternatively if it is desired to form a work piece at a temperature below the ambient temperature, such atmosphere may be cooled before it is circulated through the chamber 330 and the ram and bed plates, if provided with cooling means, may be cooled by circulating a cooling fluid through their transverse passages. In the event that the temperature within the chamber must be relatively high and above the temperature at which the substance of which the seals are formed would tend to deteriorate, a cooling fluid may be circulated through the passages of the two seal members by means of the conduits connected thereto. Such cooling fluid will of course be maintained under sufficient pressure within the passages to maintain the seal members in sealing engagement with the seal flange.

Since the sealing means of the apparatus 300 forms a positive seal which is not gas permeable, the work piece may be formed or worked under a pressure lower than ambient atmospheric pressure. In this case one of the conduits, for example, the conduit 331, may be connected to a suitable pump while the other conduit 335 is closed by means of its valve 336 and the pressure in the chamber 330 can be reduced by operation of the pump since the seals will of course prevent flow of gas from the air exteriorly of the apparatus into the chamber 330. Such reduction of pressure in chamber 330 may also be for the purpose of removing occluded gases from the work piece and from the apparatus before the desired atmosphere is introduced into the chamber.

It will now be apparent that the apparatus 300 permits a work piece to be formed or shaped in chamber having a controlled environment at desired temperature, pressure and atmosphere conditions, and that the pressure may be greater or lower than atmospheric pressure and the temperature higher or lower than atmospheric pressure.

It will further be seen that the atmosphere may be a single gas or a mixture of gases in desired proportions as may be required by the characteristics of the substance of the work piece is made and the characteristics which it is desired that the work piece possess.

It will further be seen that the apparatus embodying the invention includes a pair of members movable relative to one another and forming a closed chamber in operative relationship, that the apparatus includes means for controlling such environmental conditions within the chamber as temperature, pressure and the atmosphere, and that such environmental conditions may be changed at various steps in the process of forming or working a work piece as required. For example, the work piece may be introduced into the chamber and under one set of atmospheric conditions which may then be changed so that the work piece may be worked, formed or treated under different conditions and that such conditions may again be changed prior to the removal of the work piece from such chamber.

The foregoing description of the invention is explanatory only, and changes in the details of the construction illustrated may be made by those skilled in the art, within the scope of the appended claims, without departing from the spirit of the invention.

What is desired and claimed to be secured by Letters Patent is:

1. A forming apparatus including: top and bottom die assemblies movable toward one another, said die assemblies having forming surfaces facing one another between which a work piece is positionable; means for raising the temperature of said forming surfaces; and gas permeable seal means operatively associated with said die assemblies for providing a substantially closed chamber about the work piece positioned between said forming surfaces when said die assemblies are moved toward one another.

2. A forming apparatus including: top and bottom die assemblies movable toward one another, said die assemblies having forming surfaces facing one another between which a work piece is positionable; means for raising the temperature of said forming surfaces; gas permeable seal means operatively associated with said die assemblies for providing a substantially closed chamber about the work piece positioned between said forming surfaces when said die assemblies are moved toward one another; and means for introducing an inert gas into said chamber to force oxygen containing air out of said chamber through said gas permeable seal means.

3. A forming apparatus including: top and bottom die assemblies movable toward one another, said die assemblies having forming surfaces facing one another between which a work piece is positionable; means for raising the temperature of said forming surfaces; gas permeable seal means operatively associated with said die assemblies for providing a substantially closed chamber about the work piece positioned between said forming surfaces when said die assemblies are moved toward one another; means for introducing an inert gas into said chamber to force oxygen containing air out of said chamber through said gas permeable seal means; and means for maintaining the pressure of said inert gas in said chamber higher than the pressure of gas exteriorly of said apparatus whereby said flow of air from the exterior of said apparatus into said closed chamber can not take place.

4. An apparatus including: a pair of members movable towards one another; one of said members having a continuous groove and another having a seal flange, said seal being received in said groove when said members are in operative relationship relative to one another; means in said groove engageable with said seal flange for providing with said members a closed chamber, said means in said groove comprising a granular substance; and means for varying predetermined environmental conditions within said chamber.

5. The apparatus of claim 4, and means for introducing an inert gas into said chamber to force air out of said chamber through said granular substance and about said seal flange when said seal flange is in said groove with its lower portion inserted in said granular substance.

6. The apparatus of claim 5, wherein said means for introducing inert gas comprises a plurality of spaced passages provided in each of said forming members opening to said chamber.

7. The apparatus of claim 1, wherein said gas permeable seal means comprises an upwardly opening trough about one of said die assemblies, a continuous downwardly extending flange about the other of said die assemblies and movable into said trough when said top die assembly is moved toward said bottom die assembly, and a granular substance in said trough into which said flange is movable when said top die assembly is moved downwardly toward said bottom die assembly.

8. The apparatus of claim 2, wherein said gas permeable seal means comprises an upwardly opening trough about one of said die assemblies, a continuous downwardly extending flange about the other of said die assemblies and movable into said trough when said top die assembly is moved toward said bottom die assembly, and a granular substance in said trough into which said flange is movable when said top die assembly is moved downwardly toward said bottom die assembly.

References Cited

UNITED STATES PATENTS

| | | | |
|---|---|---|---|
| 2,944,500 | 7/1960 | Raynes | 266—2.5 X |
| 3,189,337 | 6/1965 | North | 266—2.5 |
| 3,199,853 | 8/1965 | Olsen | 266—5 |

RICHARD J. HERBST, *Primary Examiner.*

U.S. Cl. X.R.

72—364